United States Patent [19]

Karol

[11] 4,306,766

[45] Dec. 22, 1981

[54] OPTICAL FIBER TERMINALS WITH V-GROOVE ALIGNMENT

[75] Inventor: James J. Karol, Unadilla, N.Y.

[73] Assignee: The Bendix Corporation, Southfield, Mich.

[21] Appl. No.: 71,641

[22] Filed: Aug. 31, 1979

[51] Int. Cl.³ .............................................. G02B 5/14
[52] U.S. Cl. .................................................. 350/96.21
[58] Field of Search ................ 350/96.20, 96.21, 96.22

[56] References Cited

U.S. PATENT DOCUMENTS

| | | | |
|---|---|---|---|
| 3,885,859 | 5/1975 | Dalgleish et al. | 350/96.21 |
| 4,008,948 | 2/1977 | Dalgleish et al. | 350/96.21 |
| 4,088,386 | 5/1978 | Hawk | 350/96.21 |
| 4,105,285 | 8/1978 | Bedgood et al. | 350/96.21 |
| 4,178,068 | 12/1979 | Hoover | 350/96.22 |
| 4,217,031 | 8/1980 | Migniew et al. | 350/96.21 |
| 4,218,113 | 8/1980 | Uberbacher | 350/96.21 |

FOREIGN PATENT DOCUMENTS

| | | | |
|---|---|---|---|
| 2529352 | 1/1976 | Fed. Rep. of Germany | 350/96.21 |
| 2636997 | 2/1978 | Fed. Rep. of Germany | 350/96.21 |
| 2389148 | 12/1978 | France | 350/96.21 |

*Primary Examiner*—Stewart J. Levy
*Attorney, Agent, or Firm*—Paul J. Ethington; Raymond J. Eifler; Charles D. Lacina

[57] ABSTRACT

A pin terminal (12) and a socket terminal (62) with self-alignment means (32, 54) in the pin is disclosed for coupling free ends of a pair of optical fibers (50, 52). The pin and socket terminal (12, 62) are adapted for mounting in respective connector members (10, 18) of the multiple terminal type. The self-alignment means for the fibers includes an alignment channel (32) in the pin and a spring wire (54) disposed in the channel. A bottom wall of the channel is a V-groove and the spring wire urges the free ends of the fibers into the V-groove when the fibers are inserted from opposite ends of the channel.

18 Claims, 9 Drawing Figures

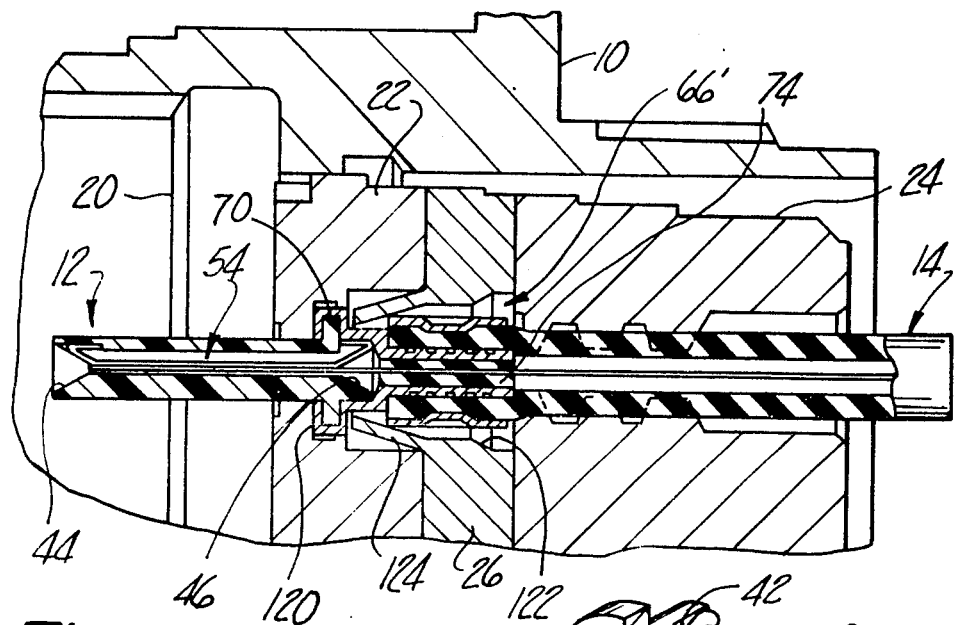
Fig-1
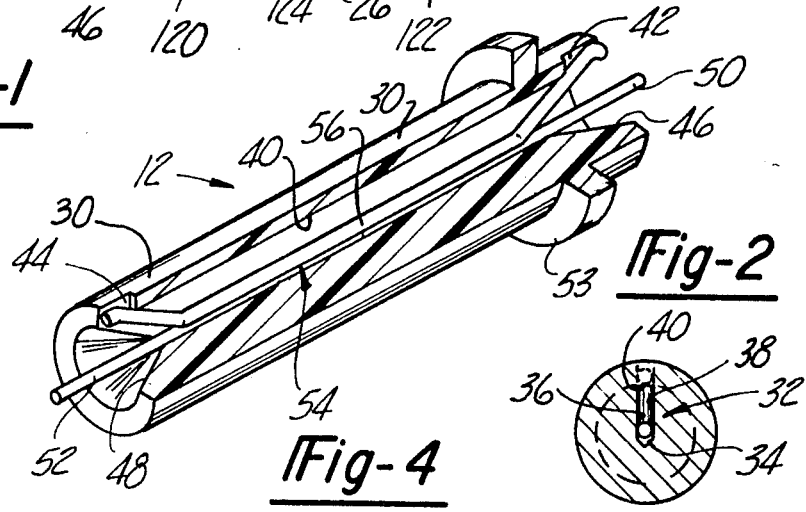
Fig-4
Fig-2
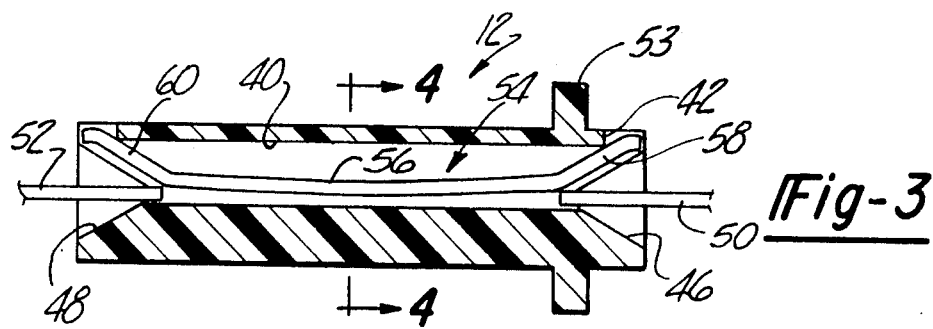
Fig-3

4,306,766

OPTICAL FIBER TERMINALS WITH V-GROOVE ALIGNMENT

TECHNICAL FIELD

This invention relates to connectors for optical fiber cables; more particularly, it relates to mating terminals for optical fibers which are especially adapted for holding optical fibers in alignment.

BACKGROUND OF THE INVENTION

In optical systems using fiber optics for transmitting signals by light energy, it is often necessary to couple two fibers end-to-end for the signal transmission path. The optical fibers are of very small diameter and are of fragile construction. Typically, an optical fiber cable comprises an optical fiber covered by a jacket of plastic material for protecting the fiber from damage due to handling during installation and exposure in its operating environment. A typical single filament cable comprises a glass fiber having a diameter of a few thousands of an inch and a protective jacket having a diameter of a few hundreds of an inch. In order to minimize the coupling losses at the interface of the two optical fibers, the ends of the fibers must be accurately aligned.

A connector for optical fiber cables must provide for accurate alignment of the fibers being joined. Additionally, the connector should provide support for the cable jacket in order to relieve the fiber itself from stress for so-called strain relief. A most difficult problem in optical fiber connectors has been that of providing simple and effective terminations or contacts for the fibers which facilitate repeated connection and disconnection from each other and which afford accurate alignment of the fibers upon reconnection.

In the prior art, pairs of single filament optical fiber cables are coupled in end-to-end relationship by attaching a ferrule to the end of each fiber and mechanically aligning and connecting the ferrules together. Typically, in this prior art, the fiber is encased in the ferrule so that the end of the fiber is flush with the end of the ferrule. Two fibers are coupled by placing the respective ferrules in end-to-end abutting relationship. This type of connector is disclosed in U.S. Pat. No. 4,087,158 granted to Lewis et al. and U.S. Pat. No. 4,090,778 granted to Phillips et al.

Also in the prior art, attempts have been made to provide an optical fiber cable connector in which a termination supports a cable with a free end of the fiber extending therefrom. The free ends of corresponding pairs of optical fibers are disposed in a V-groove on one of the terminations and a holding means on the other termination bears against the fibers to hold them in alignment. This kind of arrangement is disclosed in U.S. Pat. No. 3,885,859 granted to Dalgleish et al. and in U.S. Pat. No. 4,088,386 granted to Hawk.

A general object of this invention is to provide an optical fiber cable connector with terminals which overcome certain disadvantages of the prior art.

DISCLOSURE OF THE INVENTION

In accordance with this invention, a termination is provided for optical fibers which facilitate connection of a pair of optical fibers in accurate alignment with each other. This is accomplished by a termination which comprises a body with an alignment channel for receiving the endwise insertion of a pair of fibers from opposite ends. One fiber is secured to the rearward end of the body and extends partially through the channel and the other fiber is inserted endwise from the forward end. Alignment is provided by holding means occupying part of the channel in the path of the endwise insertion of the fibers and being resiliently displaceable in a lateral direction by the insertion whereby the fibers are urged laterally into alignment with each other against a wall of the channel. Preferably, the fibers are urged into alignment in a V-shaped bottom wall of the channel.

Further, in accordance with this invention, means are provided for repeated connection and disconnection of a pair of optical fibers in accurate alignment. This is accomplished by a pair of mating terminations in the form of pin and socket terminal. The aforementioned alignment channel and holding means are incorporated into the pin. One optical fiber cable is secured to the rearward end of the pin and a free end of the fiber is inserted into the channel. The other cable is secured to the socket with the free end of the fiber extending partially through the socket. When the pin is inserted into the socket, the fibers are brought into aligned abutment with each other by the alignment channel and holding means.

In a preferred embodiment, the holding means comprises a resilient wire which is disposed in the channel and extends axially thereof opposite the bottom wall. The channel has spaced, parallel side walls extending from a V-shaped bottom wall to a top wall. The wire has an axially extending midsection and end sections extending obliquely away from the V-shaped bottom wall into recesses in the top wall. The junctures of each oblique end section with the central section are of arcuate configuration whereby the wire is resiliently displaced by a camming action upon insertion of a fiber into the channel.

A more complete understanding of this invention will be obtained from the description that follows, taken with the accompanying drawings.

DESCRIPTION OF THE DRAWINGS

FIG. 1 shows the invention embodied in a pin terminal of a connector for fiber optic cables, FIG. 2 shows a perspective view partially in section of the pin terminal, FIG. 3 shows a sectional view of the pin terminal, FIG. 4 shows a view taken on lines 4—4 of FIG. 3.

BEST MODE FOR CARRYING OUT THE INVENTION

Figure 5:
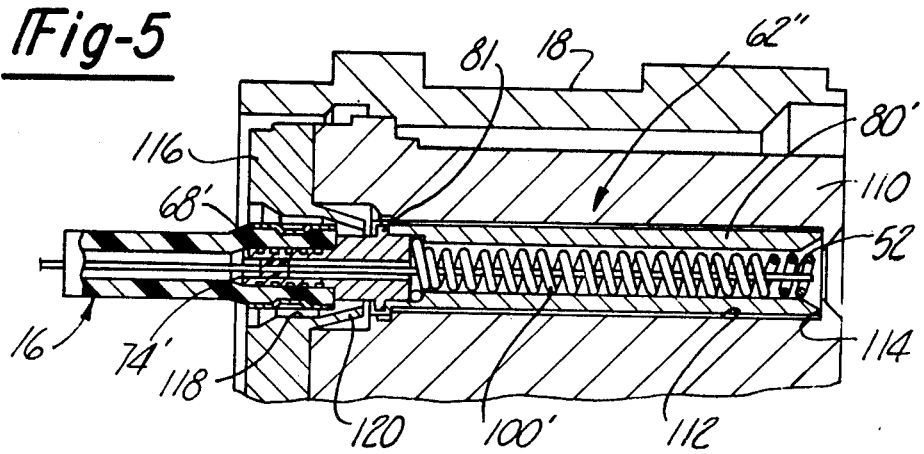
FIG. 5 shows a socket terminal in a connector, according to this invention.

Referring now to the drawings, there is shown an illustrative embodiment of the invention in an optical fiber cable connector using pin and socket terminals. In this embodiment, means for alignment of the ends of a pair of optical fibers is incorporated into the pin terminal which matingly engages the socket terminal of a separable connector. It will be appreciated, as the description proceeds, that the invention is useful in many different applications.

FIG. 1 is a fragmentary view of a separable connector which is adapted for connecting multiple pairs of optical fiber cables. The connector, except for the pin and socket terminal is suitably of the same type and structure as multiple contact cable connectors used in the electronic circuits. A connector member or shell 10 of cylindrical structure supports multiple pin terminal 12 for coupling an optical fiber cable 14 to a corresponding cable 16 in a mating connector member or shell 18 (see FIG. 5). As shown in FIG. 1, the pin contact 12 is supported in the connector shell 10 by an assembly including an interfacial seal 20 and a pair of inserts 22 and 24 having a contact retention member 26 therebetween. The support for the pin terminal 12 and the optical fiber cable 14 will be described in greater detail subsequently.

The pin terminal 12 is shown in detail in FIGS. 2, 3 and 4. The pin terminal is adapted to receive the free ends of a pair of optical fibers 50 and 52 which are inserted into the pin in abutting end-to-end relationship in accurate alignment with each other. The pin 12 comprises an elongated body 30 of circular cross-section and is preferably constructed of molded plastic. The pin 12 defines an axially extending channel 32 which extends from end-to-end of the pin. The channel 32 includes a V-shaped bottom wall or V-groove 34 which is substantially coaxial of the pin. The channel 32 has a pair of spaced, parallel sidewalls 36 and 38 extending from the V-groove bottom wall 34 to a top wall 40. An opening 42 is provided in the top wall 40 at the rearward end of the body 30 and a recess 44 is provided in the forward end of the body for purposes which will be described subsequently. The body is provided with a tapered opening 46 at the rearward end of the pin terminal and a tapered opening 48 at the forward end, such openings constituting entrances to the channel 32 to facilitate insertion of an optical fiber at each end. The body 30 of the pin terminal 12 is provided with an annular flange or shoulder 53 for mounting purposes, as will be described subsequently.

The channel 32 in the body 30 is adapted to receive the pair of optical fibers 50 and 52 in abutting end-to-end relationship. The fibers are adapted to be placed in axial alignment with each other in the V-groove 34 of the channel. In order to guide and maintain the fibers into alignment and in seating engagement with the V-groove, holding means in the form of a spring wire 54 is disposed within the channel 32. The spring wire 54 is provided with a central section 56 which, as shown in FIG. 2 is substantially straight and extends axially of the channel with the fibers 50 and 52 in place. The central section 56, in its free state as shown in FIG. 3 is slightly arcuate and occupies a part of a channel in which the fibers 50 and 52 are to be inserted. The spring wire 54 is also provided with an obliquely extending end section 58 and an obliquely end section 60, both end sections lying in the same plane. The spring wire 54 is suitably installed in the body 30 of the pin terminal by inserting the end section 58 from the forward end of the pin terminal and allowing it to flex as required to assume the position as shown in FIG. 3.

When the optical fiber 50 of the cable 14 is inserted into the rearward end of the pin terminal 12, as depicted in FIG. 3, the end of the fiber is guided by the tapered recess 46 into the channel 32. Upon entrance of the fiber into the channel, it engages the arcuate surface of the spring wire 54 near the juncture of the end section 58 and central section 56 thereof. This engagement, imposes a slight resisting force to the insertion of the fiber and the spring wire is deflected out of the way of the fiber but it exerts a lateral force thereon which seats the fiber in the V-groove 34. The fiber 50 is inserted partially through the pin terminal 12 to approximately the mid-point, and the fiber is secured to the pin in a manner which will be described subsequently. The pin terminal 12 is adapted to receive the other optical fiber 52 by endwise insertion at the front end of the pin terminal. The fiber 52 is inserted in the same manner as described with reference to fiber 50 to a point at which it is in abutment with the end of the fiber 50. The fibers 50 and 52 are thus positively seated in the V-groove 34 under the influence of spring wire 54 and are thus held in accurate axial alignment with each other. Any excessive motion of the optical fiber 52 upon insertion into the channel 32 will be taken up by slight buckling of the fiber 52 or fiber 50 at a point outside the confines of the body 30.

Figure 9:
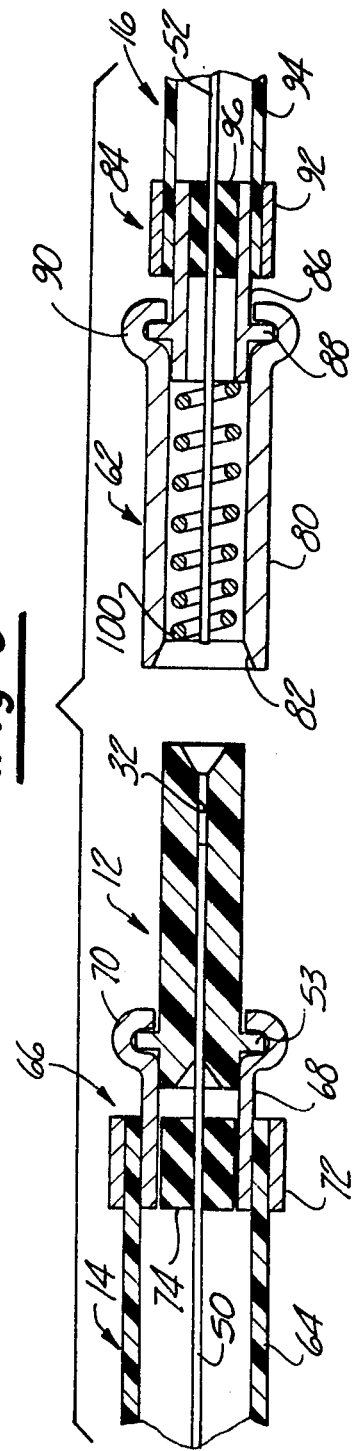
FIG. 9 shows a pin and socket in opposed relationship.

As illustrated in FIG. 9, the pin terminal 12 is adapted to coact with a socket terminal 62. Before proceeding with the description of the socket terminal 62, the mounting of the pin terminal on the optical fiber cable 14 will be described. The cable 14 comprises the optical fiber 50 and a protective jacket 64 of plastic material. For installing the pin terminal 12, the jacket 14 is stripped from a free end portion of the fiber 50. A fitting 66 is adapted to connect the terminal pin 12 to the cable 14 and secure the fiber 50 in fixed relation to the pin terminal and to secure the jacket 64 to provide strain relief for the fiber. The fitting 66 comprises an inner sleeve 68 of metal which is mounted on the body 30 by a rolled flange 70 which engages the annular shoulder 50 on the body. The fitting 66 also comprises an outer sleeve 72 of metal which is disposed coaxially of the inner sleeve 68 with an annular space therebetween to receive the end of the jacket 64. An elastomeric body or grommet 74 is disposed within the inner sleeve 68 to restrain movement of the optical fiber 50 relative to the pin 12. As shown in FIG. 9, the grommet 74 has a passage therethrough to receive the fiber 50. It will be understood that the fiber 50 is sufficiently flexible that it could be laid along side the grommet 74 to achieve the same purpose. With the fitting 66 in place, as illustrated in FIG. 9, the outer sleeve 72 is crimped radially against the inner sleeve 68 which is crimped inwardly against the grommet 74 so that the fiber 50 and the jacket 64 are firmly gripped by the fitting. The fitting is shown before crimping in FIG. 9 and is shown after crimping as fitting 66' in FIG. 1.

Referring further to FIG. 9, the socket terminal 62 is disposed in mating alignment with the pin terminal 12. The socket terminal 62 comprises a sleeve 80 of metal having an inside diameter which receives the pin 12 in telescopic relation with a clearance fit. The sleeve is suitably provided at its forward end with a tapered recess 82 for facilitating entry of the pin terminal 12. The socket terminal 62 is adapted to be mounted on the end of the optical fiber cable 16 by a fitting 84. The fitting 84 comprises an inner sleeve 86 having an external annular flange or shoulder 88. The sleeve 80 of the socket 62 is mounted on the inner sleeve 86 by a rolled flange 90 which engages the shoulder 88. The fitting 84 also includes an outer sleeve 92 which is disposed coaxially of the inner sleeve 86 with an annular space therebetween for receiving the end of the jacket 94 of the cable 16. An elastomeric body or grommet 96 is disposed within the inner sleeve 86 and is adapted to secure the optical fiber 52 in a fixed relation with the socket terminal 62 in the manner described above with reference to grommet 74. The outer sleeve 92 and inner sleeve 86 are crimped radially so that the grommet 96 is deformed and the optical fiber 52 and the jacket 94 are securely gripped by the fitting.

The free end of the optical fiber 52 extends partially through the sleeve 80 of the socket terminal 62. Because of the flexibility of the optical fiber, it tends to droop at the free end. In order to provide support for the end of the fiber, a coil spring 100 is disposed within the sleeve 80 in surrounding relationship to the optical fiber. When the spring 100 is in its free state or extended as shown in FIG. 9, the free end of the optical fiber 52 is held thereby near the central axis of the socket terminal 62.

As shown in FIG. 9, when the pin terminal 12 is inserted into the socket terminal 62, the free end of the optical fiber 52 in the socket terminal will enter the channel 32 in the pin terminal. The spring 100 will be compressed by the pin toward the rear of the socket and the end of the optical fiber 50 will abut the end of the optical fiber 98. The length of the optical fibers is such that the ends will reach abutting engagement before the pin is bottomed out in the socket. In the event that abutment of the fibers occurs before the pin is fully inserted the fibers will take up the excess motion by a harmless buckling in the area where the fibers are unsupported. With the pin and socket terminal in the mated condition as described, the optical fibers 50 and 52 are held in alignment by the alignment means described with reference to FIGS. 2, 3 and 4.

Figure 8:
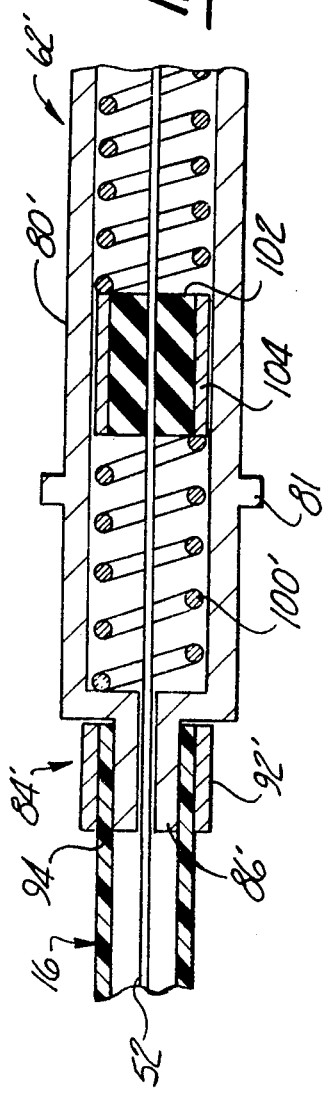
FIG. 8 shows an alternate construction.

An alternate embodiment of the socket terminal is illustrated in FIG. 8. In this embodiment the socket terminal comprises a cylindrical sleeve 80' having an annular mounting shoulder 81. The socket terminal 62 is mounted on the optical fiber cable 16 by a fitting 84' similar to the fitting 84 of FIG. 9. The fitting 84' comprises an inner sleeve 86' which is formed integrally with the sleeve 80'. An outer sleeve 92' is disposed coaxially of the inner sleeve 86' with annular space therebetween to receive the jacket 94 of the cable 16. The optical fiber 52 extends through the inner sleeve 86' and an elastomeric body 102 is secured thereto within the sleeve 80'. A metal sleeve 104 around the elastomeric body 102 is crimped inwardly to compress the sleeve against the fiber 52 so that the body is fixedly attached. A coil spring 100' is disposed within the sleeve 80' in surrounding relationship with the fiber 52 and with two adjacent coils spanning the elastomeric body 102. In this embodiment, insertion of the pin terminal 12 into the socket 62' will compress the spring 100' and the ends of the fibers will reach an abutting condition. Any excess motion of the pin terminal will cause the fibers to buckle as described above. Thus buckling of the fiber 52 will be assisted by the force of the pin terminal being asserted against the elastomeric body 102. This is especially desirable in connection with relatively stiff optical fibers, such as those of larger size.

FIG. 5 illustrates a socket terminal 62" installed in a connector member 18. The socket terminal 62" is substantially the same as contact 62' of FIG. 8 except that the elastomeric body 102 is not used. Instead, fiber 52 is held fast to the socket terminal by an elastomeric body 74' within the sleeve 68', as described with reference to FIG. 9. Other parts of the socket terminal 62" are substantially the same as corresponding parts in the terminal 62' of FIG. 8 and the same reference characters are used. The socket terminal 62" is mounted in the connector sleeve 18 by an insert 110 which is contained within the sleeve 18. The socket terminal 62" is fitted within an axial bore 112 in the insert 110 and the forward end of the socket terminal 62" is seated against a shoulder 114 at the forward end of the insert. The socket terminal 62" is retained in the bore 112 by a retention member 116 contained within the sleeve 18 against the rearward end of the insert 110. The retention member 116 is provided with an opening 118 through which the socket terminal 62" extends. The opening 118 is surrounded by a plurality of retention fingers 120 which are disposed behind the mounting shoulder 81 on the socket terminal 62" and hold it in place in the insert 110.

The pin terminal 12 is mounted in the connector sleeve 10 in a manner similar to that just described for the sleeve terminal 62". Reverting back to FIG. 1, the pin terminal 12 mounted in the inserts 22, 24 and in the retention member 26 which are contained within the connector sleeve 10. It is noted that the pin terminal 12 is of substantially the same construction as that described with reference to FIGS. 2, 3, 4, 5 and 9 and the parts thereof are designated by the same reference characters. The pin terminal 12 extends through a bore in the insert 22 and the mounting shoulder 70 of the pin terminal is seated against a shoulder 120 on the insert 22. The forward end of the terminal pin 12 extends through the interfacial seal 20 for engagement with a corresponding socket terminal. The pin terminal 12 is held in place by the retention member 26 which has an opening 122 surrounded by plural retention fingers 124. The retention fingers 124 are disposed behind the mounting shoulder 90 and hold the pin terminal 12 in position in the insert 22. The cable 14 extends from the rearward end of the pin terminal 12 through the insert 24.

Figure 6:
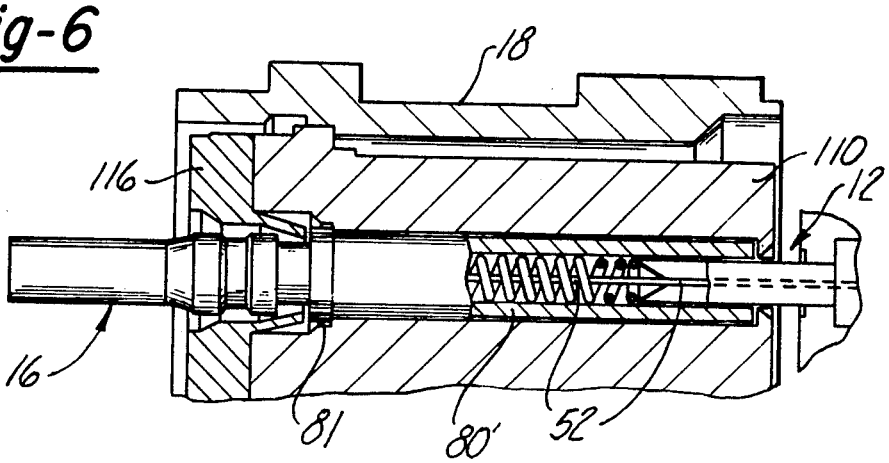
FIG. 6 shows a pin and socket in mated condition.
Figure 7:
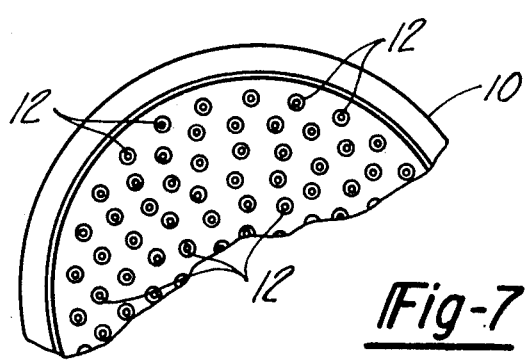
FIG. 7 is a view of a connector having multiple terminals.

As shown in the fragmentary view of FIG. 7, the connector member or sleeve 10 includes multiple pin terminal 12. Similarly, the connector member 18 includes multiple socket terminal 62" each of which corresponds with one of the pin terminal 12. Accordingly, when the connector members 10 and 18 are placed in mating engagement, each pin terminal 12 enters a corresponding socket terminal 62". This relationship is illustrated in FIG. 6. It is noted that the pair of optical fibers 50 and 52 are brought into accurate axial alignment by the alignment means in the pin terminal when the pin terminal enters the socket terminal. The separable connector members 10 and 18 may be repeatedly connected and disconnected and the corresponding pin and socket terminal will be reconnected each time with self-alignment of the optical fibers.

Although the description of this invention has been given with reference to a particular embodiment, it is not to be construed in a limiting sense. Many variations and modifications will now occur to those skilled in the art. For a definition of the invention, reference is made to the appended claims.

What is claimed is:
1. In a connector for coupling a pair of optical fibers,
a body defining a channel for receiving the endwise insertion of said fibers in opposed end-to-end relationship and
means for holding the inserted fiber ends in the body channel, said means occupying part of said channel in the path of said endwise insertion, said means being in contact with a substantial axial length of the fiber end portions, in register with a wall of the channel and resiliently displaceable in a lateral direction by said insertion whereby upon insertion of said fiber ends into said channel said means urges said fiber end portions laterally against the wall of the channel and holds the fibers in the body in coupled relationship.

2. The invention as defined in claim 1 wherein said holding means urges the end portions of the fibers against a bottom wall of said channel, said bottom wall being V-shaped in cross-section.

3. The invention as defined in claim 2 wherein said body is elongated and said channel extends from one end to the other end.

4. The invention as defined in claim 3 wherein at least one end of said body defines a tapered opening in alignment with said channel.

5. The invention as defined in claim 1 wherein said holding means comprises a resilient axially extending wire.

6. The invention as defined in claim 5 wherein said wire urges the fibers against the bottom wall of said channel, said bottom wall being V-shaped in cross-section.

7. The invention as defined in claim 6 wherein said body is elongated and said channel extends from one end to the other end.

8. The invention as defined in claim 7 wherein said wire is disposed in said channel and extends axially thereof opposite said bottom wall, the ends of said wire being supported by said body.

9. The invention as defined in claim 8 wherein said channel has spaced parallel side walls extending from said V-shaped bottom wall and has a top wall opposite said bottom wall for supporting the end of said wire.

10. The invention as defined in claim 9 wherein said body is cylindrical and wherein said top wall defines a recess, said wire having one end disposed in said recess.

11. The invention as defined in claim 10 wherein said body is a unitary molded plastic body.

12. The invention as defined in claim 8 wherein said wire has an axially extending central section and opposite end sections extending from the central section away from said V-shaped bottom wall of the channel, the junctures of each oblique section with said central section being of arcuate configuration whereby said wire is resiliently displaced by a camming action upon insertion of a fiber.

13. A mateable pair of terminals for coupling optical fibers comprising:

a pin having an axial channel extending from a rearward end to a forward end of the pin for receiving the end wise insertion of said fibers, means for securing an optical fiber to the rearward end of the pin with the fiber extending partially through the channel, said channel being adapted to receive another optical fiber removably extending into the forward end of the pin, a socket having a forward end adapted to receive said pin in telescopic relation, means for securing another optical fiber to the rearward end of the socket with the free end of the fiber extending partially through said socket, whereby said free end enters said channel at the forward end of the pin when the pin is matingly engaged with the socket, and means for holding a substantial axial length of the end portions of the two fiber ends in opposed end-to-end relationship, said holding means occupying part of said channel in the path of said end wise insertion of said fibers and being in contact with and resiliently displaceable in a lateral direction by said fiber insertion whereby said holding means urges the axial length of the two fiber end portions laterally into alignment with each other and against the channel.

14. The invention as defined in claim 13 wherein said holding means urges said fibers against a bottom wall of said channel, said bottom wall being V-shaped in cross-section.

15. The invention as defined in claim 14 wherein said holding means comprises a resilient axially elongated wire.

16. The invention as defined in claim 15 wherein said wire is disposed in said channel and extends axially thereof opposite said bottom wall.

17. The invention as defined in claim 16 wherein said channel has spaced parallel side walls extending from said V-shaped bottom wall and has a top wall opposite said bottom wall for supporting the ends of said wire.

18. The invention as defined in claim 17 wherein said wire has an axially extending central section and opposite end sections extending from the central section obliquely away from said V-shaped bottom wall of the channel, the junctures of each oblique section with said central section being of arcuate configuration whereby said wire is resiliently displaced by a camming action upon insertion of a fiber.

* * * * *